United States Patent
Simmons

(10) Patent No.: US 10,876,551 B2
(45) Date of Patent: Dec. 29, 2020

(54) HYDRAULIC ACTUATOR IMPLEMENTED ROBOTIC JOINT

(71) Applicant: William Davis Simmons, Santa Clara, CA (US)

(72) Inventor: William Davis Simmons, Santa Clara, CA (US)

(*) Notice: Subject to any disclaimer, the term of this patent is extended or adjusted under 35 U.S.C. 154(b) by 0 days.

(21) Appl. No.: 16/715,055

(22) Filed: Dec. 16, 2019

(65) Prior Publication Data

US 2020/0116169 A1    Apr. 16, 2020

Related U.S. Application Data

(63) Continuation-in-part of application No. 15/353,732, filed on Nov. 16, 2016, now Pat. No. 10,539,164, which is a continuation of application No. 14/031,845, filed on Sep. 19, 2013, now Pat. No. 9,528,532.

(60) Provisional application No. 61/706,645, filed on Sep. 27, 2012.

(51) Int. Cl.
| | |
|---|---|
| F15B 15/28 | (2006.01) |
| F15B 13/16 | (2006.01) |
| B25J 9/14 | (2006.01) |
| F15B 13/10 | (2006.01) |
| F15B 7/08 | (2006.01) |
| F15B 7/00 | (2006.01) |
| F15B 15/10 | (2006.01) |

(52) U.S. Cl.
CPC ........... *F15B 15/2861* (2013.01); *B25J 9/144* (2013.01); *F15B 7/003* (2013.01); *F15B 7/08* (2013.01); *F15B 13/10* (2013.01); *F15B 13/16* (2013.01); *F15B 15/103* (2013.01)

(58) Field of Classification Search
CPC . F15B 15/103; F15B 2013/0448; F15B 7/003
USPC .................................................. 92/90, 91, 92
See application file for complete search history.

(56) References Cited

U.S. PATENT DOCUMENTS

| | | | |
|---|---|---|---|
| 7,898,121 B2 * | 3/2011 | Ramsay | H02K 41/031 310/14 |
| 2011/0203265 A1 * | 8/2011 | Matsumoto | F15B 15/18 60/325 |

* cited by examiner

*Primary Examiner* — F Daniel Lopez
*Assistant Examiner* — Daniel S Collins
(74) *Attorney, Agent, or Firm* — Douglas L. Weller

(57) ABSTRACT

A robotic joint that includes a hydraulic actuator. The hydraulic actuator includes a hollow tube that has a first opening at a first end of the hollow tube and that has a second opening at a second end of the hollow tube. The hollow tube contains hydraulic fluid. A moveable magnet moves within hollow tube as a result of a magnetic field within the hollow tube. A magnetic field source located outside the hollow tube creates the magnetic field within the hollow tube. When the moveable magnet moves to the first end of the hollow tube, a first piston pushes hydraulic fluid out of the first opening. When the moveable magnet moves to the second end of the hollow tube a second piston pushes hydraulic fluid out of the second opening.

18 Claims, 5 Drawing Sheets

US 10,876,551 B2

HYDRAULIC ACTUATOR IMPLEMENTED ROBOTIC JOINT

BACKGROUND

Hydraulic cylinders are mechanical actuators that get power from pressurized hydraulic fluid. A hydraulic cylinder typically includes a cylinder barrel in which a piston connected to a piston rod moves back and forth. The piston divides the hydraulic cylinder into a first chamber and a second chamber. When the hydraulic pump pushes hydraulic fluid into the first chamber, a valve in the second chamber is open allowing hydraulic fluid to drain from the second chamber into a reservoir as movement of the piston within the hydraulic cylinder increases the volume of the first chamber and correspondingly reduces the volume of the second chamber. Likewise, when the hydraulic pump pushes hydraulic fluid into the second chamber, a valve in the first chamber is open allowing hydraulic fluid to drain from the first chamber into the reservoir as movement of the piston within the hydraulic cylinder increases the volume of the second chamber and correspondingly reduces the volume of the first chamber.

Typically, the hydraulic pump runs at a constant speed to produce hydraulic pressure. If motion is not imminent, the unused pressured hydraulic fluid is returned to the reservoir or stored in an accumulator.

DETAILED DESCRIPTION

Figure 1:
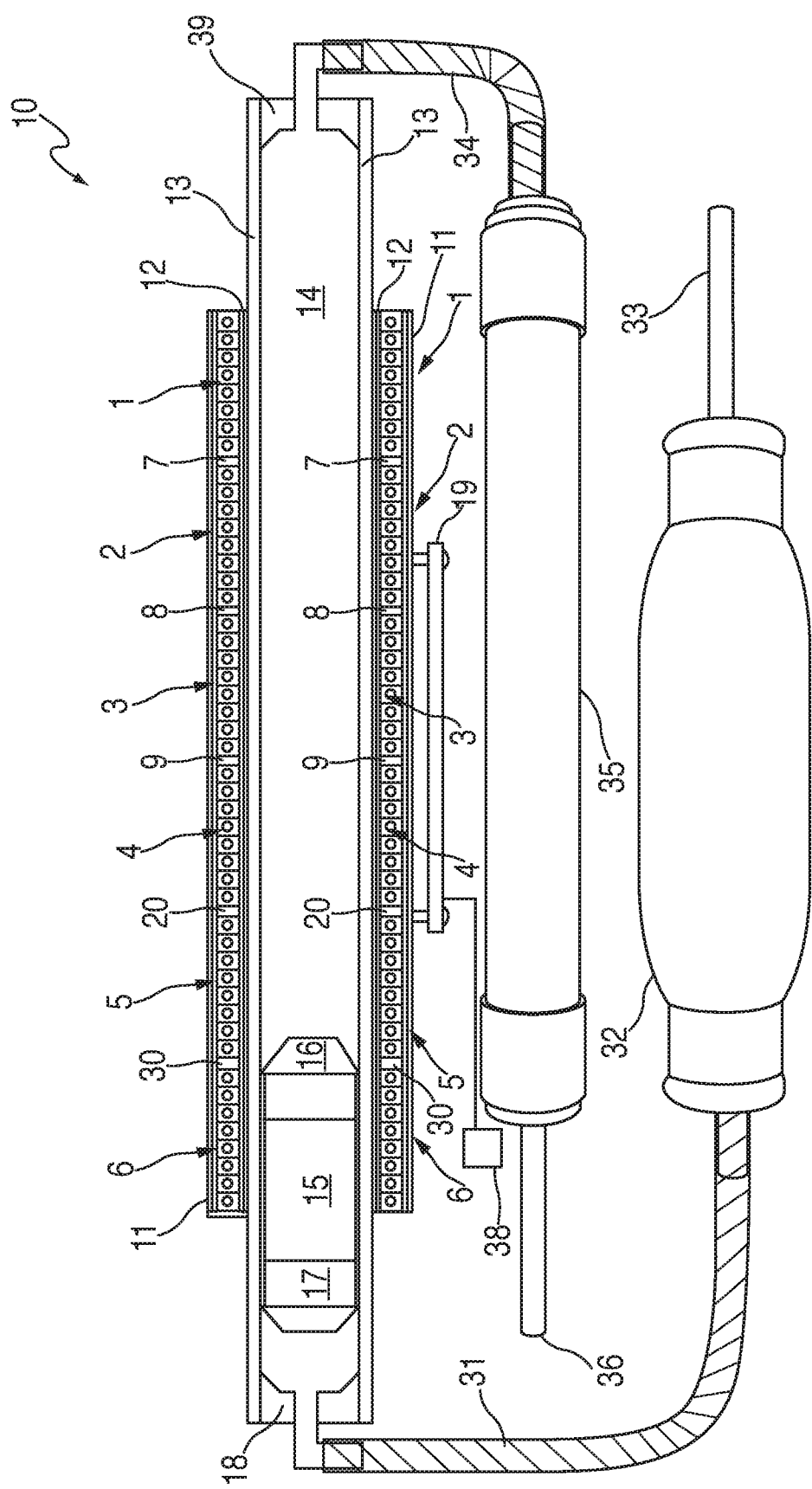
FIG. 1 shows a hydraulic actuator system in accordance with an embodiment.

FIG. 1 shows a hydraulic actuator system. The hydraulic actuator includes a hydraulic actuator 10. A cross section of hydraulic actuator 10 is shown in FIG. 1.

A hollow tube 13 is encased by wire windings, represented in FIG. 1 by wire windings 1, wire windings 2, wire windings 3, wire windings 4, wire windings 5 and wire windings 6. Wire windings 1 are separated from wire winding 2 by a space 7. Wire windings 2 are separated from wire winding 3 by a space 8. Wire windings 3 are separated from wire winding 4 by a space 9. Wire windings 4 are separated from wire winding 5 by a space 20. Wire windings 5 are separated from wire winding 6 by a space 30. While FIG. 1 shows six separate windings—wire windings 1, wire windings 2, wire windings 3, wire windings 4, wire windings 5 and wire windings 6—the number of wire windings is exemplary and can be varied from one to twenty or even more depending on application and implementer preferences.

Activating current through a subset of the wire windings produce a magnetic field within hollow tube 13. A magnet 15 within hollow tube 13 moves as a result of and in response to the magnetic field produced by current through the subset of wire windings. For example, magnet 15 is a rare earth cylindrical magnet. For example, the wire windings are placed over a copper tube 13 and within a ferrous metal tube 11. Ferrous metal tube 11 contains and intensifies the magnetic field produced by placing current through the subset of wire windings.

Current through the wire windings produces a Lorentz force that will result in a motional electromotive force on magnet 15 that moves magnet 15 within hollow tube 13. A piston 17 and a piston 16 isolate magnet 15 from hydraulic fluid 14 within tube 13. An electronic control circuit 19 provides current to the selected subsets of the wire windings to control movement of magnet 15. By controlling amplitude of the current and direction of the current through the windings, electronic control circuit can precisely control position of moving magnet 15 within hollow tube 13. The motional electromotive force placed on magnet 15 varies based on a number of factors such the number of windings in each of the wire windings, the density of windings, the amount of current placed through the selected wire windings, the direction of the current placed through the selected wire windings, the size and shape of magnet 15, the magnetic properties of magnet 15, the proximity of the magnet 15 to the wire windings and so on.

For example, each of wire windings 1, wire windings 2, wire windings 3, wire windings 4, wire windings 5 and wire windings 6 are separately connected to electronic control circuit 19 allowing electronic control circuit 19 to separately control current through each of the wire windings. For example, electronic control circuit 19 can place pulse width current signals with current flowing in opposite directions on each of two adjacent wire windings. The resulting magnetic field will place and hold magnet 15 in a particular location within hollow tube 13 in proximity of the two adjacent wire windings. By independently varying the pulse width duration in each of the two adjacent wire windings electronic control circuit 19 can move magnet 15 in either direction along hollow tube 13.

For example, when magnet 15 is in the proximity of wire windings 3 and wire windings 4, electronic control circuit 19 can control pulse width signals in wire windings 3 and wire windings 4 to move magnet 15 towards wire windings 5. Then electronic control circuit 19 can stop the current in wire windings 3 and can control pulse width signals in wire windings 4 and wire windings 5 to move magnet 15 towards wire windings 6. And so on. For more information on using pulse width current signals through wire windings to create a Lorentz force to precisely move a magnet through magnetic fields, see for example, Bryan Craig Murphy, "Design and Construction of a Precision Tubular Linear Motor and Controller", Submitted to Texas A&M University, May 2003; Tony Morcos, "The Straight Attraction Part 1" Motion Control, June 2000, pp. 29-33; and Tony Morcos, "The Straight Attraction Part 2" Motion Control, July/August 2000, pp. 24-28.

When electronic control circuit 19 applies current through various subsets of the windings to move magnet 15 towards a sealing piston seat 18 at an end of tube 13, hydraulic fluid is forced by piston 17 through a flexible hydraulic fluid transport hose 31 and into a hydraulic muscle 32. Hydraulic muscle 32 contracts as it receives hydraulic fluid. Attachment structure 33 is pulled and can be used to pull a load, such as is necessary when flexing a robot arm. Also, as electronic control circuit 19 moves magnet 15 towards sealing piston seat 18 of tube 13, hydraulic fluid is drawn by piston 16 into tube 13 from a flexible hydraulic fluid transport hose 34 and out of a hydraulic muscle 35. This allows hydraulic muscle 35 to relax and be extended. As can be seen by the above discussion, hollow tube 13 needs to be sufficiently large to provide a volume of hydraulic fluid to hydraulic muscle 32 so that hydraulic muscle 32 can sufficiently contract a desired amount and to provide a volume of hydraulic fluid to hydraulic muscle 35 so that hydraulic muscle 35 can sufficiently contract a desired amount.

A feedback sensor 38, electrically connected to electronic control circuit 19, can be used to monitor extension of attachment structure 36. This can allow electronic control circuit 19 to precisely control movement. While in FIG. 1, feedback sensor 38 is shown positioned to monitor extension of attachment structure 36, feedback sensor 38 can be located at other locations to monitor other phenomena, such as location of attachment structure 33, to provide feedback information to electronic control circuit 19. Also, more than one feedback sensor can be used.

When electronic control circuit 19 applies current through various subsets of the windings to move magnet 15 towards a sealing piston seat 39 at another end of tube 13, hydraulic fluid is forced by piston 16 through a flexible hydraulic fluid transport hose 34 and into a hydraulic muscle 35. Hydraulic muscle 35 contracts as it receives hydraulic fluid. Attachment structure 36 is pulled and can be used to pull a load, such as is necessary when flexing a robot arm. Also, as electronic control circuit 19 moves magnet 15 towards sealing piston seat 39 of tube 13, hydraulic fluid is drawn by piston 17 into tube 13 from a flexible hydraulic fluid transport hose 31 and out of a hydraulic muscle 32. This allows hydraulic muscle 32 to relax and be extended.

The use of motional electromotive force on magnet 15 to pressurize hydraulic fluid makes it easy to allow for compliance to obstructions. That is, when an unexpected obstruction is met during movement, the increased resistance to movement can be detected by the jump in current required to continue the motion. Electronic control circuit 19 can limit the current resulting in stopping the motion of magnet 15 within the magnetic field produced by wire windings 1, wire windings 2, wire windings 3, wire windings 4, wire windings 5 and wire windings 6.

Figure 2:
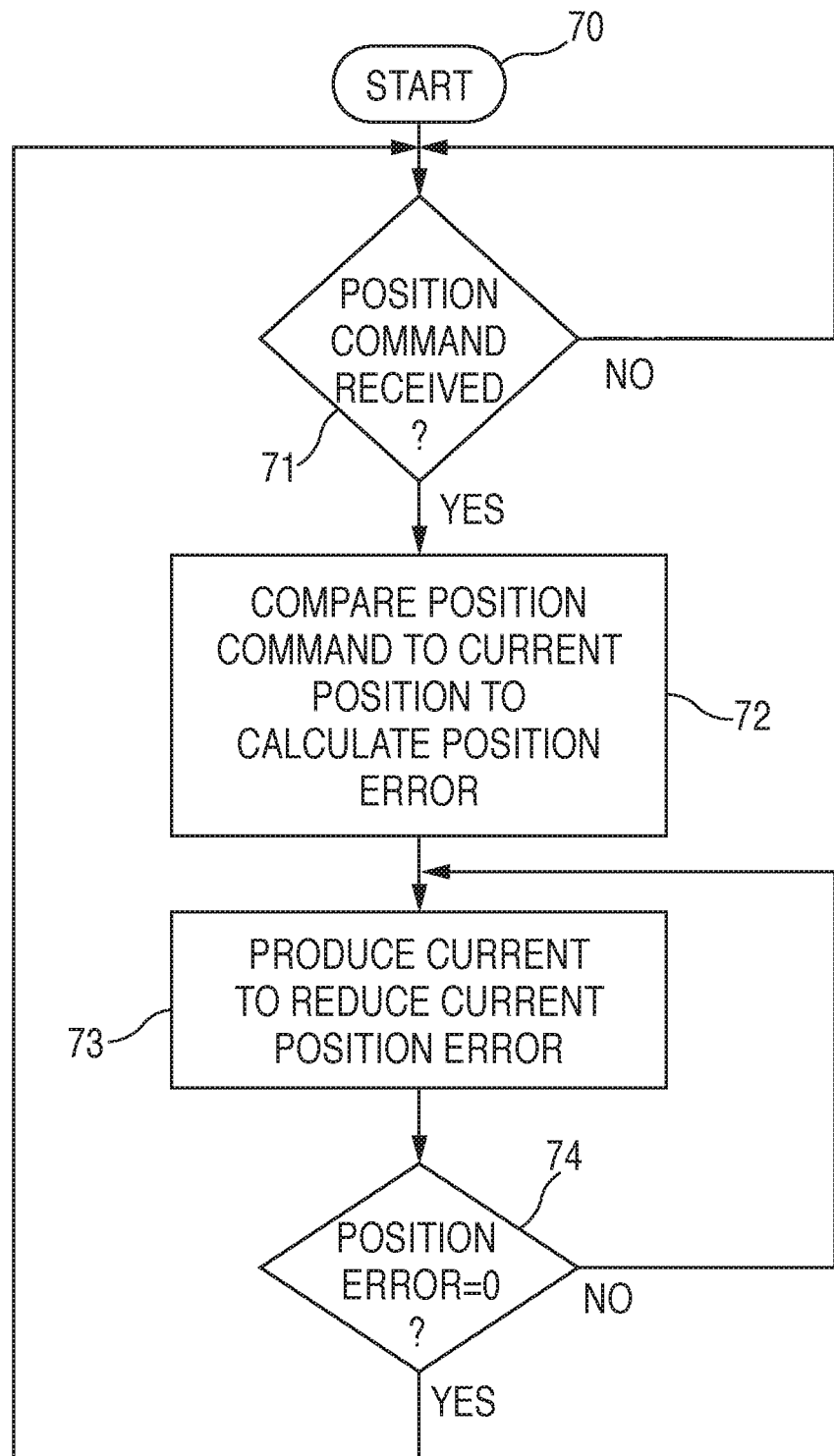
FIG. 2 is a simplified flow chart illustrating operation of an electronic control circuit within the hydraulic actuator system shown in FIG. 1 in accordance with an embodiment.

FIG. 2 is a simplified flow chart illustrating operation of electronic control circuit 19. When operation is started, as illustrated by a block 70, electronic control circuit 19, in a block 71 will wait until a position command is received. For example, a position command is sent by a computer, or some other user device in communication with electronic control circuit 19 and configured to send position commands to electronic control signal 19.

When a position command is received, in a block 72, electronic control circuit 19 will compare a requested position in a position command to a current position reported by feedback sensor 38 to calculate a position error. The position error tells how far and what direction attachment structure 36 needs to move in order to be in the requested position. In a block 73 electronic control circuit 19 will generate current through wire windings 1, wire windings 2, wire windings 3, wire windings 4, wire windings 5 and wire windings 6. that will move magnet 15 in a direction that will cause attachment structure 36 to move closer to the requested position. In a block 74, information from feedback sensor 38 will be monitored until attachment structure 36 is in the requested position.

If it is desired to control speed of motion, commands to electronic control circuit can specify a requested speed of motion (e.g., slow, medium, fast) and electronic control circuit can control current placed through the wire windings to accommodate the requested motion speed.

The hydraulic actuator system shown in FIG. 1 can be attached to a lever on a pivot or rack and pinion gear to produce various movements, such as a limited circular movement. Multiple hydraulic actuator systems can be connected together to produce multiple degrees of freedom, such as in the joints of robot arms or legs.

Figure 3:
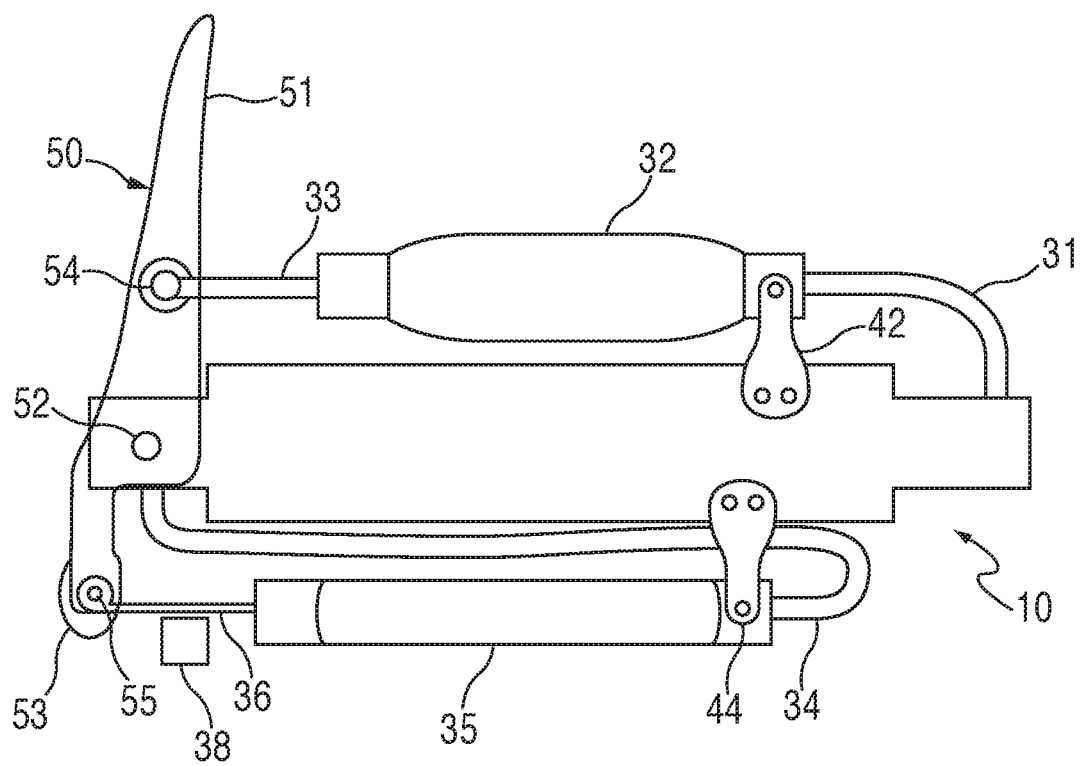
FIG. 3 shows the hydraulic actuator system shown in FIG. 1 integrated as part of a robotic joint in accordance with an embodiment.

For example, FIG. 3 shows the actuator system of FIG. 1 used as part of a movable joint in a robotics system. Hydraulic actuator 10 is connected to a lever 50 at a pivot 52. Hydraulic muscle 32 is anchored to hydraulic actuator 10 by a bracket 42. Hydraulic muscle 35 is anchored to hydraulic actuator 10 by a bracket 44. Attachment structure 33 is anchored at pivot 54 to an arm 51 of lever 50. Attachment structure 36 is anchored at pivot 55 to an extended portion 53 of lever 50. When hydraulic muscle 32 pulls attachment structure 33, robotic arm 51 pulls toward hydraulic muscle 32 and hydraulic actuator 10. When hydraulic muscle 35 pulls attachment structure 36, robotic arm 51 extends away from hydraulic muscle 32 and hydraulic actuator 10. Robotic arm 51 and hydraulic actuator 10 thus together act as a joint in a robotics system.

Figure 4:
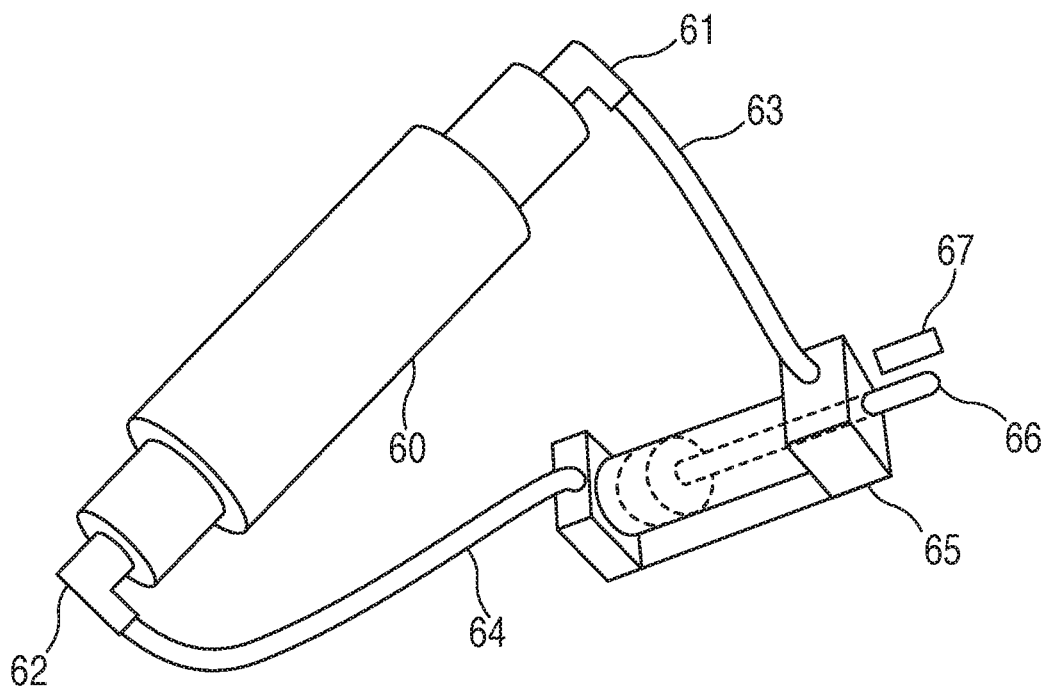
FIG. 4 shows a hydraulic actuator used with a hydraulic cylinder in accordance with an embodiment.

FIG. 4 shows another embodiment where a hydraulic actuator 60 is connected to a hydraulic cylinder 65. When a magnet within hydraulic actuator 60 is moved towards an end 62 of hydraulic actuator 60, hydraulic fluid is pushed through a flexible hydraulic fluid transport hose 64 into hydraulic cylinder 65 to correspondingly extend a piston 66 out of hydraulic cylinder 65. When the magnet within hydraulic actuator 60 is moved towards an end 61 of hydraulic actuator 60, hydraulic fluid is pushed through a flexible hydraulic fluid transport hose 63 into hydraulic cylinder 65 to correspondingly retract piston 66 into hydraulic cylinder 65. A feedback sensor 67 monitors position of piston 66 and communicates position information to an electronic control system of hydraulic actuator 60.

In the above-discussed embodiments, piston 16, piston 17, sealing piston seat 18 and sealing piston seat 39 are constructed for complete seal with no slippage of hydraulic fluid. Alternatively, any or all of piston 16, piston 17, sealing piston seat 18 and sealing piston seat 39 can be constructed to allow some pressurized hydraulic fluid to slip past at a certain predetermined pressure to allow for compliance when obstructions in movement are encountered. If this results in loss of calibration of hydraulic actuator 10 or air in fluid chambers, this can be alleviated by appropriately bleeding the hydraulic system of hydraulic actuator 10.

Also in the above-described embodiments, electronic control system 19 controls movement of magnet 15 in two directions. In an alternative embodiment, the magnet can be spring loaded on one end to so that motion in one direction is achieved by motional electromotive force and motion in the other direction is achieved by force from the spring.

Also in the above-described embodiments, magnet 15 moves while the wire windings are stationary with respect to hollow tube 13. In an alternative embodiment, magnets may be fixed to a hollow tube and be used as a magnetic field source. Within the hollow tube a moveable magnet is an electromagnet that includes wire windings. The electromagnet moves within the hollow tube and as a result of and in response to the magnetic field created by the magnetic field source interacting with the magnet qualities of the moveable magnet produced by the amplitude and current placed through the wire windings.

Also in the above-described embodiments, a hydraulic actuator is shown connected to hydraulic muscles and a hydraulic cylinder. In alternate embodiments, a hydraulic actuator can be connected to other hydraulic devices. For example, hydraulic actuator 10 can be connected to a hydraulic bladder and used to inflate and deflate the hydraulic bladder to alternate a state of the hydraulic bladder between a limp flexible condition and a stiff or rigid condition.

The size of hydraulic actuator 10 can be scaled to be larger or smaller to fit requirements of a particular implementation. Hydraulic actuator 10 can be used in products that need circular hydraulic muscle effects that tighten or loosen around an object, producing a squeezing force. The double action valve function of hydraulic actuator 10 both pressurizes fluid depressurizes fluid depending on a configuration of the hydraulic actuator system. Hydraulic actuator 10 can be used with any product that needs to efficiently and fluidly move a load in a straight line in either direction over a limited distance.

A hydraulic actuator, such as described above, provides the ability for push-pull movement of a joint. In order to maintain control over the movement, sensors provide position and/or a velocity feedback allowing the joint to have stability with accurate response to command signaling. For example, a fusion of sensors that are accelerometers, gyroscopes and magnetometers can be used. The fusion is accomplished through algorithms executed on Inertial Measurement Units (IMU). The results of the fusion are, for example, in the form of a 3D complex number known as the Quaternion, which takes the form of $w+xi+yj+zk$. This technique of fusing the readings from the accelerometer, gyroscope and magnetometer is commonly known as nine degrees of freedom (9DOF), since each sensor provides readings on three orthogonal axes, x, y and z, commonly referred to as Euclidean space. Orientation and position information can thus be derived. Alternatively, another type of sensor device can be used to provide feedback, as will be understood by persons of ordinary skill in the art.

When a number of hydraulic actuators are linked together, orientation information becomes vital in controlling the position and orientation of the end effector that is moved through 3D space by combination movements of the individual hydraulic actuators connected by movable joints.

For example, to provide orientation information in a system using hydraulic actuators and one or more end effectors, each hydraulic actuator or end effector has a sensor affixed to it, such that the sensor moves through 3D space precisely as does the hydraulic actuator or effector. For example, each sensor is a 9DOF IMU. From readings of each sensor, position and orientation of the sensor, as it is affixed to the hydraulic actuator or end effector, is expressed as a quaternion.

For example, numerous hydraulic actuators, having numerous sensors affixed, provide positions and orientations at each robotic joint. For example, multiple robotic joints can be linked together or one or more robotic joints can have multiple axes of movement. In this case, quaternions based on information from the sensors form a "matrix" which fully describes the position and orientation of not only each robotic joint, but also the position and orientation of each robotic joint in relation to each of the other robotic joints that form an assembled body.

Quaternion mathematics provides techniques for rendering movement, position and orientation in 3D space. For example, a quaternion rotation matrix can be multiplied with a position/orientation quaternion of a given joint, to solve the position/orientation quaternion at a new destination for the joint. Feedback is therefore provided to a controller such that movement continues until the destination quaternion is sensed. Sufficient sensor update rates are necessary for smooth movement from origin to destination. Relative position/orientation quaternions of the multiple sensors with respect to one another, describe the exact disposition of the total body of linked hydraulic actuators.

For example, an artificial neural network is trained and used to track position and orientation matrices of quaternions that describe the instantaneous position and orientation of each individual joint as well as the disposition of the total body formed by the numerous hydraulic actuators moving numerous joints. The movement, position and orientation of an end effector can be calculated and held by solving the quaternion matrix necessary to position and orient the numerous joints to achieve the position and orientation of the end effector.

When a body, consisting of numerous hydraulic actuators forming numerous robotic joints each having a sensor affixed, is not supported by a rigid structure and free stands as a two or more legged assembly, continuous sensor updates are not only required, but also continuous quaternion position/orientation solutions that counteract outside disturbance forces by correcting deviations, provide free standing balance of the body.

For example, continuous movement can occur when a body, consisting of numerous hydraulic actuators forming numerous robotic joints each having a sensor affixed, is walking as a two or more legged assembly. This type of continuous movement requires not only continuous sensor updates and continuous quaternion position/orientation solutions, but also requires continuous response to outside disturbance forces and continuous corrections to deviations to achieve balance of the body while moving in a prescribed manner.

There is a limited range of motion of each robotic joint in an assembled body consisting of linked hydraulic actuators; therefore, there is a finite number of the matrices of quaternions that are possible in the description of the disposition of the assembled body. As will be understood by person of ordinary skill in the art, an artificial neural network can be trained to recognize the finite number of differing matrices and conclude with high confidence, the disposition of the assembled body.

Figure 5:
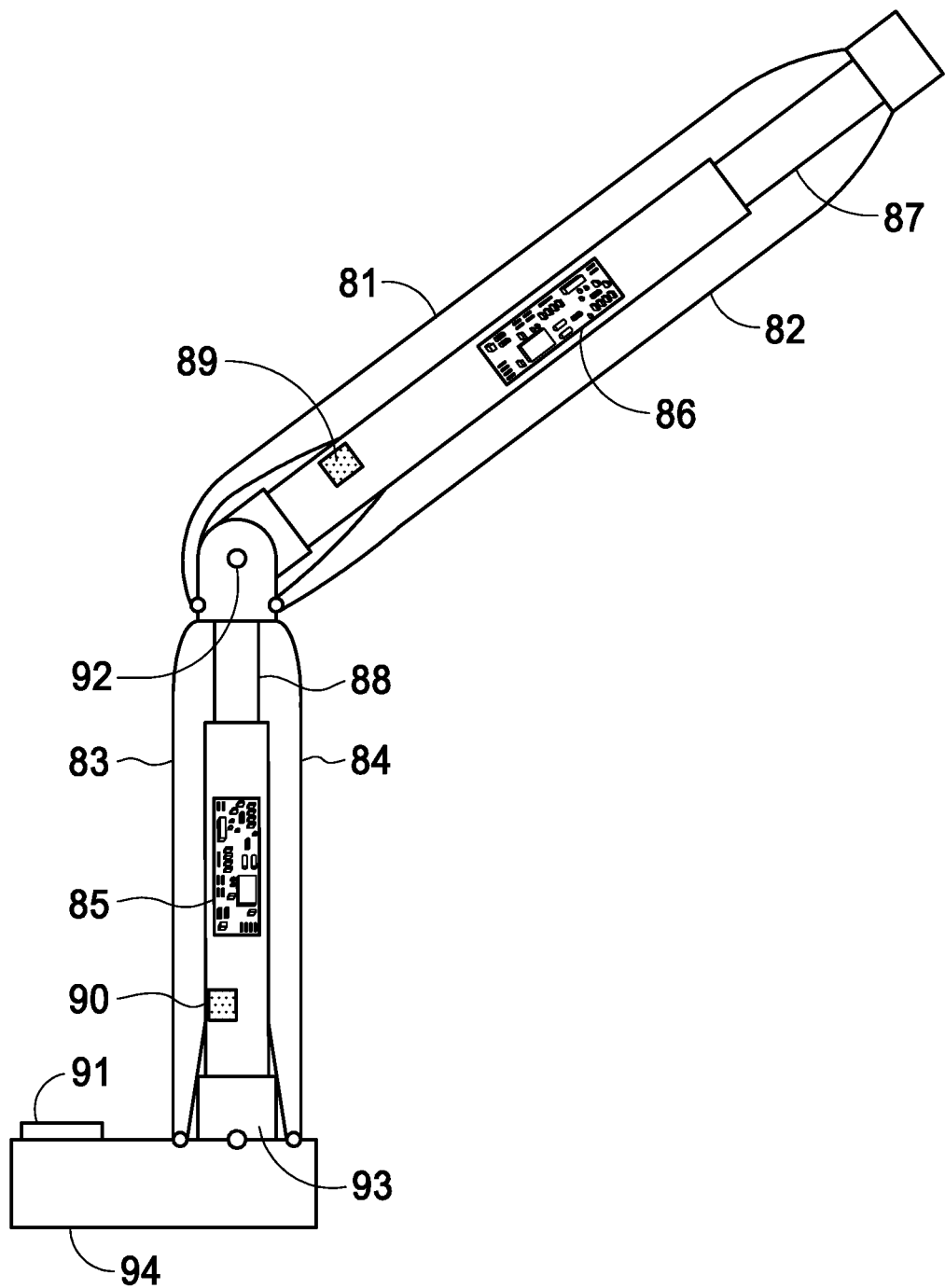
FIG. 5 shows a joint formed by hydraulic actuators in accordance with an embodiment.

FIG. 5, gives an example of an appendage, such as a leg or an arm, formed in accordance with the discussion of above. A hydraulic actuator 87 is connected at a connecting joint 92 to a hydraulic actuator 88. An end effector 94 is a rigid member that is connected at a connecting joint 93 to hydraulic actuator 88. In this illustration, hydraulic actuator 87 and attached hydraulic muscles acts as part of an "upper appendage", such as an upper leg or upper arm. Hydraulic actuator 88 and attached hydraulic muscles acts as part of an "lower appendage", such as a lower leg or lower arm. End effector 94 acts as a "terminating appendage member", such as a foot or hand.

An anterior hydraulic muscle 81 and a posterior hydraulic muscle 82 control relative position of hydraulic actuator 88 with respect to connecting joint 92. An anterior hydraulic muscle 83 and a posterior hydraulic muscle 84 control relative position of end effector 94 with respect to connecting joint 93.

An actuator controller board 86 controls multiple wire coils and a moving magnet within actuator 87 to control anterior hydraulic muscle 81 and posterior hydraulic muscle 82. An actuator controller board 856 controls multiple wire coils and a moving magnet within actuator 88 to control anterior hydraulic muscle 83 and posterior hydraulic muscle 84.

A sensor 89 and a sensor 90 monitor relative positioning of hydraulic actuator 87 and hydraulic actuator 88 around connecting joint 92. Sensor 90 and a sensor 91 monitor relative positioning of hydraulic actuator 88 and end effector 94 around connecting joint 93.

For example, sensor 89, sensor 90 and sensor 91 are each a nine degrees of freedom (9 DOF) inertial measurement unit (IMU) sensor. For example, sensor 89 provides a position and orientation in three dimensional space represented by the following quaternion: $w_1+x_1i+y_1j+z_1k$. Sensor 90 provides a position and orientation in three dimensional space represented by the following quaternion: $w_2+x_2i+y_2j+z_2k$. Sensor 91 provides a position and orientation in three dimensional space represented by the following quaternion: $w_3+x_3i+y_3j+z_3k$. In this case, disposition of the body forming the "leg" is represented by the matrix shown below:

$$\begin{matrix} w_1 & x_1 & y_1 & z_1 \\ w_2 & x_2 & y_2 & z_2 \\ w_3 & x_3 & y_3 & z_3 \end{matrix}$$

Figure 6:
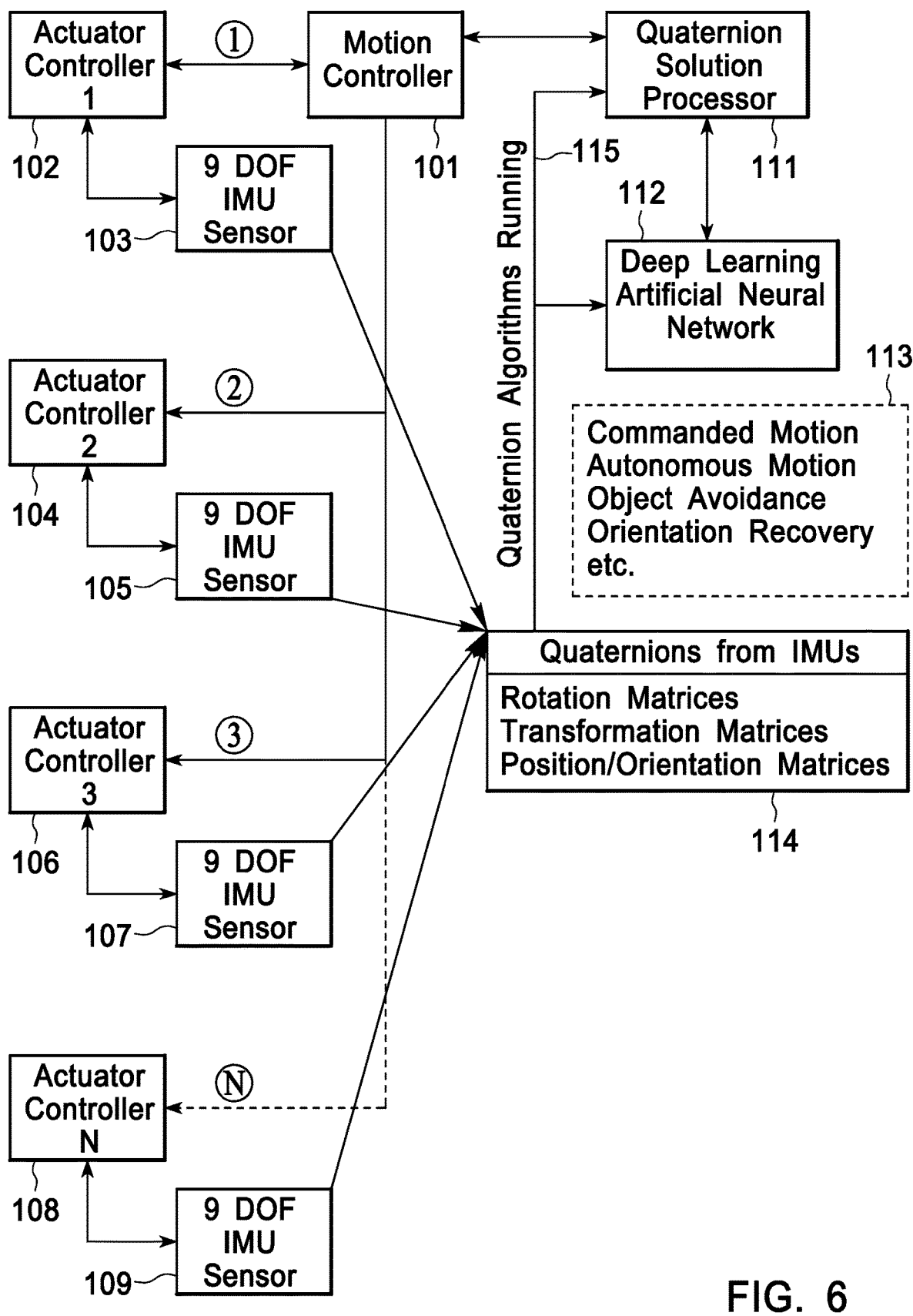
FIG. 6 shows a simplified block diagram of a control system used to control a hydraulic actuator robotic system. in accordance with an embodiment.

FIG. 6 is a simplified block diagram of a control system used to control a hydraulic actuator robotic system. A motion controller 101 oversees motion control of an arbitrary number of actuator controllers represented in FIG. 6 by an actuator control 102, an actuator control 104, an actuator control 106 and an actuator control 108. Each of the actuator controller communicates with a sensor. For example, actuator controller 102 communicates with a sensor 103, actuator controller 104 communicates with a sensor 105, actuator controller 106 communicates with a sensor 107 and actuator controller 108 communicates with a sensor 109. For example, sensor 103, sensor 105, sensor 107 and sensor 109 are each a 9 DOF IMU sensor. Dashed line 110 represents that more or fewer actuator controllers and their sensors can be included in the actuator system dependent upon a desired configuration. Lines labeled 1, 2, 3 and N represent that the number of actuator controllers connected to motion controller 101 varies.

A quaternion solution processor 111 directs motion controller 101 based on information from sensors 103, 105, 107, 109 and any additional sensors. For example, monitoring system block 114 represents reception and processing of information from sensors 103, 105, 107, 109 and any additional sensor. For example, the information can be received from the sensors using wireless communication or using wired communication, for example through links to the actuator controllers. The generated quaternions from the sensors include, for example, position/orientation matrices and/or other types of matrices indicating positioning information. Communication path 115 represents quaternion algorithms producing information used by quaternion solutions processor 111 and a deep learning artificial neural network 112. For example, solutions processor 111 uses inertial measurement unit (IMU) sensor quaternions to determine and monitor position and orientation. For example, solutions processor 111 generates transportation matrices and transformation matrices to plot movements.

As represented by block 113, deep learning artificial neural network 112 can provide information useful in determining commanded motion, autonomous motion, object avoidance, orientation, recovery and so on. As discussed above, deep learning artificial neural network 112 is trained and used to track position and orientation matrices of quaternions that describe the instantaneous position and orientation of each individual joint as well as the disposition of the total body formed by the numerous hydraulic actuators moving numerous joints. The movement, position and orientation of an end effector can be calculated and held by solving the quaternion matrix necessary to position and orient the numerous joints to achieve the position and orientation of the end effector.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A robotic joint, comprising:
   a rigid member including a first sensor;
   a first hydraulic muscle having a first end connected to the rigid member;
   a second hydraulic muscle having a first end connected to the rigid member;
   a hydraulic actuator connected to a second end of the first hydraulic muscle and connected to a second end of the second hydraulic muscle, the hydraulic actuator including:
     a second sensor,
     a hollow tube, having a first opening at a first end of the hollow tube and having a second opening at a second end of the hollow tube,
     hydraulic fluid within the hollow tube,
     a magnet within the hollow tube,
     a first piston on a first end of the magnet wherein when the magnet moves toward the first end of the hollow tube the first piston pushes hydraulic fluid out of the first opening into the first hydraulic muscle,
     a second piston on a second end of the magnet wherein when the magnet moves toward the second end of the hollow tube the second piston pushes hydraulic fluid out of the second opening into a second hydraulic muscle, and
     a positioning system that allows precise positioning of the magnet to any selected location the magnet can reach between the first end of the hollow tube and the second end of the hollow tube, the positioning system including:
       a wire windings around the hollow tube, and
       a control circuit that is connected to the wire windings allowing the control circuit to control current through the wire windings creating a magnetic field that exerts a motional electromotive force on the magnet controlling movement and brings the magnet to a selected position between the first end of the hollow tube and the second end of the hollow tube;
   a connecting joint that connects the rigid member to the hydraulic actuator; and
   a monitoring system that receives positioning information from the first sensor and the second sensor and uses the positioning information to track a relative position of the hydraulic actuator and the rigid member with respect to the connecting joint.

2. A robotic joint as in claim 1, wherein the first sensor and the second sensor are each an inertial measurement (IMU) with nine degrees of freedom.

3. A robotic joint as in claim 1, wherein the rigid member is an end effector.

4. A robotic joint as in claim 1, wherein the rigid member is a second hydraulic actuator.

5. A robotic joint as in claim 1, wherein the wire windings are arranged as a plurality of sets of wire windings and the control circuit is separately connected to each set of wire windings allowing the control circuit to separately control current through each set of wire windings.

6. A robotic joint as in claim 5, wherein the control circuit determines the current to be placed through each set of wire windings by comparing a precise location to current position to calculate a position error, and then places current through each set of wire windings as necessary to reduce the position error.

7. A robotic joint as in claim 5, wherein in response to a command to control speed of motion, the control circuit separately controls amount of the current through each set of wire windings to bring the magnet to the precise location at the speed specified by the command.

8. A hydraulic actuator system as in claim 1, wherein the control circuit uses pulse width current signals to create a Lorentz force to precisely move the magnet.

9. A robotic joint as in claim 1:
wherein when the magnet moves to the first end of the hollow tube the second piston draws hydraulic fluid from the second opening into the hollow tube; and,
wherein when the magnet moves to the second end of the hollow tube the first piston draws hydraulic fluid from the first opening into the hollow tube.

10. A robotic joint, comprising:
a rigid member including a first sensor;
a first hydraulic muscle having a first end connected to the rigid member;
a second hydraulic muscle having a first end connected to the rigid member;
a hydraulic actuator connected to a second end of the first hydraulic muscle and connected to a second end of the second hydraulic muscle, the hydraulic actuator including:
a second sensor,
a hollow tube, having a first opening at a first end of the hollow tube and having a second opening at a second end of the hollow tube,
hydraulic fluid within the hollow tube,
a moveable magnet within the hollow tube, the moveable magnet moving within hollow tube as a result of a magnetic field within the hollow tube,
a first piston on a first end of the moveable magnet, wherein when the moveable magnet moves toward the first end of the hollow tube, the first piston pushes hydraulic fluid out of the first opening into the first hydraulic muscle,
a second piston on a second end of the moveable magnet, wherein when the moveable magnet moves toward the second end of the hollow tube, the second piston pushes hydraulic fluid out of the second opening into the second hydraulic muscle, and
a controller that precisely controls positioning of the moveable magnet to any selected location the magnet can move to between the first end of the hollow tube and the second end of the hollow tube by, wherein the precise control of positioning is performed by, in response to positioning commands, separately controlling magnitude and polarity of the magnetic field to direct the moveable magnet to a selected location;
a connecting joint that connects the rigid member to the hydraulic actuator; and
a monitoring system that receives positioning information from the first sensor and the second sensor and uses the positioning information to track a relative position of the hydraulic actuator and the rigid member with respect to the connecting joint.

11. A robotic joint as in claim 10, wherein the first sensor and the second sensor are each an inertial measurement (IMU) with nine degrees of freedom.

12. A robotic joint as in claim 10, wherein the rigid member is an end effector.

13. A robotic joint as in claim 10, wherein the rigid member is a second hydraulic actuator.

14. A robotic joint as in claim 10:
wherein when the magnet moves to the first end of the hollow tube the second piston draws hydraulic fluid from the second opening into the hollow tube; and,
wherein when the magnet moves to the second end of the hollow tube the first piston draws hydraulic fluid from the first opening into the hollow tube.

15. A robotic appendage comprising:
a terminating appendage member including a first sensor;
a lower appendage, including:
a first posterior hydraulic muscle having a first end connected to the terminating appendage member,
a first anterior hydraulic muscle having a first end connected to the terminating appendage member, and
a first hydraulic actuator connected to a second end of the first posterior hydraulic muscle and connected to a second end of the first anterior hydraulic muscle, the first hydraulic actuator including:
a second sensor,
a first hollow tube, having a first opening at a first end of the first hollow tube and having a second opening at a second end of the first hollow tube,
hydraulic fluid within the first hollow tube,
a first moveable magnet within the first hollow tube, the first moveable magnet moving within first hollow tube as a result of a magnetic field within the first hollow tube,
a first piston on a first end of the first moveable magnet, wherein when the first moveable magnet moves toward the first end of the first hollow tube, the first piston pushes hydraulic fluid out of the first opening,
a second piston on a second end of the first moveable magnet, wherein when the first moveable magnet moves toward the second end of the first hollow tube, the second piston pushes hydraulic fluid out of the second opening, and
a first controller that precisely controls positioning of the first moveable magnet to any selected location the magnet can move to between the first end of the first hollow tube and the second end of the first hollow tube by, wherein the precise control of positioning is performed by, in response to positioning commands, separately controlling magnitude and polarity of the magnetic field to direct the first moveable magnet to a selected location;

a first connecting joint that connects the terminating appendage member to the first hydraulic actuator;
an upper appendage, including:
a second posterior hydraulic muscle having a first end connected to the first hydraulic actuator,
a second anterior hydraulic muscle having a first end connected to the first hydraulic actuator, and
a second hydraulic actuator connected to a second end of the second posterior hydraulic muscle and connected to a second end of the second anterior hydraulic muscle, the second hydraulic actuator including:
a third sensor,
a second hollow tube, having a first opening at a first end of the second hollow tube and having a second opening at a second end of the second hollow tube,
hydraulic fluid within the second hollow tube,
a second moveable magnet within the second hollow tube, the second moveable magnet moving within second hollow tube as a result of a magnetic field within the second hollow tube,
a second piston on a first end of the second moveable magnet, wherein when the second moveable magnet moves toward the first end of the second hollow tube, the second piston pushes hydraulic fluid out of the first opening of the second hollow tube,
a second piston on a second end of the second moveable magnet, wherein when the second moveable magnet moves toward the second end of the second hollow tube, the second piston pushes hydraulic fluid out of the second opening, and
a second controller that precisely controls positioning of the second moveable magnet to any selected location the magnet can move to between the first end of the second hollow tube and the second end of the second hollow tube by, wherein the precise control of positioning is performed by, in response to positioning commands, separately controlling magnitude and polarity of the magnetic field to direct the second moveable magnet to a selected location; and
a second connecting joint that connects the first hydraulic actuator to the second hydraulic actuator.

16. A robotic appendage as in claim 15, wherein the first sensor, the second sensor and the third sensor are each an inertial measurement (IMU) with nine degrees of freedom.

17. A robotic appendage as in claim 16, wherein the first sensor, the second sensor and the third sensor provide quaternions that form a quaternion matrix used by a quaternion solution processor for motion control.

18. A robotic appendage as in claim 17, wherein the quaternion solution processor utilizes a deep learning artificial neural network for at least one of the following:
commanded motion;
autonomous motion;
object avoidance;
orientation;
recovery.

* * * * *